(12) United States Patent
Kim et al.

(10) Patent No.: US 11,146,720 B2
(45) Date of Patent: Oct. 12, 2021

(54) ELECTRONIC DEVICE FOR PROVIDING FUNCTION BY USING RGB IMAGE AND IR IMAGE ACQUIRED THROUGH ONE IMAGE SENSOR

(71) Applicant: Samsung Electronics Co., Ltd., Suwon-si (KR)

(72) Inventors: Dong Soo Kim, Suwon-si (KR); Prajit Sivasankaran Nair, Bangalore (IN); Hwa Yong Kang, Suwon-si (KR); Young Kwon Yoon, Seoul (KR); Lokesh Rayasandra Boregowda, Bangalore (IN); Jong Hun Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/648,449

(22) PCT Filed: Sep. 19, 2018

(86) PCT No.: PCT/KR2018/011047
§ 371 (c)(1),
(2) Date: Mar. 18, 2020

(87) PCT Pub. No.: WO2019/059635
PCT Pub. Date: Mar. 28, 2019

(65) Prior Publication Data
US 2020/0228689 A1    Jul. 16, 2020

(30) Foreign Application Priority Data
Sep. 19, 2017    (KR) .................... 10-2017-0120616

(51) Int. Cl.
| | | |
|---|---|---|
| *H04N 5/225* | (2006.01) | |
| *H04N 5/235* | (2006.01) | |
| *H04N 5/33*  | (2006.01) | |

(52) U.S. Cl.
CPC ......... *H04N 5/2258* (2013.01); *H04N 5/2351* (2013.01); *H04N 5/33* (2013.01)

(58) Field of Classification Search
CPC .............. H04N 5/2258; H04N 5/2351; H04N 9/04559; H04N 5/33; G06K 9/00604; G06K 9/00597
See application file for complete search history.

(56) References Cited

U.S. PATENT DOCUMENTS

| | | |
|---|---|---|
| 6,759,646 B1 | 7/2004 | Acharya et al. |
| 8,412,228 B2 | 4/2013 | Yoon |
| (Continued) | | |

FOREIGN PATENT DOCUMENTS

| | | |
|---|---|---|
| JP | 2006-186536 A | 7/2006 |
| JP | 2017-118284 A | 6/2017 |
| (Continued) | | |

OTHER PUBLICATIONS

Extended European Search Report dated Sep. 29, 2020, issued in European Patent Application No. 18857514.6.
(Continued)

*Primary Examiner* — Antoinette T Spinks
(74) *Attorney, Agent, or Firm* — Jefferson IP Law, LLP

(57) ABSTRACT

An electronic device is disclosed. The electronic device may comprise: an image sensor for acquiring raw image data corresponding to light of infrared band and visible light band, with respect to an external object; and a processor, wherein the processor is configured to: receive a request for acquiring the raw image data corresponding to the external object; on the basis of the request configured to be per-
(Continued)

formed using a first function of the image sensor, generate an RGB image related to the external object by using first raw image data corresponding to the light of visible light band, obtained through the image sensor, and on the basis of the request configured to be performed using a second function of the image sensor, perform biometric authentication related to the external object by using second raw image data corresponding to the light of infrared band, obtained through the image sensor. In addition, various embodiments recognized through the specification are possible.

13 Claims, 9 Drawing Sheets

(56) References Cited

U.S. PATENT DOCUMENTS

| | | | |
|---|---|---|---|
| 9,661,230 | B2 | 5/2017 | Kwon et al. |
| 9,992,469 | B2 | 6/2018 | Otsubo et al. |
| 10,257,484 | B2 | 4/2019 | Otsubo et al. |
| 10,582,175 | B2 | 3/2020 | Otsubo et al. |
| 10,893,248 | B2 | 1/2021 | Otsubo et al. |
| 2009/0131104 | A1 | 5/2009 | Yoon |
| 2015/0009334 | A1 | 1/2015 | Kwon et al. |
| 2015/0356351 | A1* | 12/2015 | Saylor ...................... H04N 5/33 348/164 |
| 2017/0118450 | A1 | 4/2017 | Jung et al. |
| 2017/0134704 | A1* | 5/2017 | Otsubo ............. H01L 27/14603 |
| 2017/0150071 | A1 | 5/2017 | Otsubo et al. |
| 2018/0270462 | A1 | 9/2018 | Otsubo et al. |
| 2020/0154088 | A1 | 5/2020 | Otsubo et al. |

FOREIGN PATENT DOCUMENTS

| | | |
|---|---|---|
| KR | 10-2008-0029051 A | 4/2008 |
| KR | 10-0905269 B1 | 6/2009 |
| KR | 10-2015-0005335 A | 1/2015 |
| KR | 10-1588225 B1 | 7/2015 |
| KR | 10-2017-0013082 A | 2/2017 |
| KR | 10-2017-0046498 A | 5/2017 |

OTHER PUBLICATIONS

Korean Office Action dated Sep. 1, 2021, issued in Korean Patent Application No. 10-2017-0120616.

* cited by examiner

ELECTRONIC DEVICE FOR PROVIDING FUNCTION BY USING RGB IMAGE AND IR IMAGE ACQUIRED THROUGH ONE IMAGE SENSOR

TECHNICAL FIELD

Embodiments disclosed herein relate to a technology for providing a function using an RGB image and an IR image acquired through one image sensor.

BACKGROUND ART

With the advancement of information technology (IT), cameras have evolved from traditional film cameras to digital cameras. The digital camera may convert light into an electrical image signal and then store the electrical image signal as digital data (image data).

An electronic device may include an image sensor to generate the image data. The image sensor may include millions to tens of millions of unit pixels each having a photoelectric conversion element. In the photoelectric conversion element, the movement of electric charges, that is, a current, occurs according to the photoelectric effect. The image data may be generated by converting the current into a digital signal.

In recent years, according to the trend toward miniaturization and increasing number of pixels of a camera module mounted in an electronic device, the size of the unit pixel of the image sensor as described above is very small.

DISCLOSURE

Technical Problem

To obtain image data, particularly, a color image, an optical color filter may be inserted into each unit pixel, and a filter for blocking infrared light may be inserted between a lens and each unit pixel to obtain image data, particularly, a color image.

Meanwhile, as the utilization of infrared images increases, an infrared camera may be mounted on an electronic device. When the infrared camera is mounted on the electronic device, the size of the electronic device may increase. To reduce the size of the electronic device that obtains both a visible light image and an infrared image, a camera using one image sensor that obtains both the visible light image and the infrared image may be used. The camera using the image sensor may not include a filter for blocking infrared light, and the image sensor may include a unit pixel for receiving visible light and a unit pixel for receiving infrared light.

However, when the camera does not include an infrared cut-off filter, infrared components may be mixed in an RGB image obtained due to the irradiation of infrared light to the unit pixel for receiving visible light, and the quality of the RGB image may be degraded.

Embodiments disclosed herein may provide an electronic device that generates and uses an RGB image of high quality and an IR image using one image sensor by generating an RGB image from which an infrared component has been removed in an efficient method using image data obtained through one image sensor for receiving visible light and infrared light.

Technical Solution

According to an embodiment disclosed therein, an electronic device may include an image sensor that obtains raw image data corresponding to light in an infrared band and a visible band for an external object and a processor, wherein the processor may receive a request to obtain the raw image data corresponding to the external object, generate an RGB image associated with the external object using first raw image data corresponding to the light in the visible band obtained through the image sensor, based on the request being set to be performed using a first function of the image sensor, and perform biometric authentication associated with the external object using second raw image data corresponding to the light in the infrared band obtained through the image sensor, based on the request being set to be performed using a second function of the image sensor.

Furthermore, according to an embodiment disclosed therein, an electronic device may include an image sensor including a color filer array, the color filter array including a first region transmitting visible light and infrared light and a second region transmitting infrared light, a memory, and a processor electrically connected to the image sensor, a display, and the memory, wherein the processor may execute an application, obtain first raw image data using a first image data set corresponding to a first region among raw image data obtained through the image sensor in response to a request to obtain an RGB image from the application, and provide the RGB image generated based at least on the obtained first raw image data to the application, and obtain second raw image data using a second image data set corresponding to a second region among raw image data obtained through the image sensor in response to a request to obtain an IR image from the application, and provide the IR image generated based at least on the obtained second raw image data to the application.

Furthermore, according to an embodiment disclosed herein, an electronic device may include an image sensor, the image sensor including a pixel array, the pixel array including a plurality of pixels, each of the pixels including an R subpixel, a G subpixel, a B subpixel, and an IR subpixel, a display, a memory that stores instructions, and a processor electrically connected to the image sensor, the display and the memory, wherein the processor may execute instructions to perform an application associated with biometric authentication, obtain image data including eyes of a user through the image sensor, display, on the display, at least a portion of an RGB image generated based at least on first information obtained by the R subpixel, the G subpixel and the B subpixel among the image data, authenticate the user based on second information obtained by the IR subpixel while the generated RGB image is displayed on the display, and provide a function of the application according to a result of the authentication.

Advantageous Effects

According to the embodiments disclosed herein, it is possible to obtain and use an RGB image from which infrared components have been removed in an efficient manner.

According to the embodiments herein, it is possible to perform biometric authentication with an IR image while displaying an RGB image on a display using one image sensor.

In addition, various effects may be provided that are directly or indirectly understood through the disclosure.

DESCRIPTION OF DRAWINGS

With regard to description of drawings, the same or similar components may be designated by the same or similar reference numerals.

MODE FOR INVENTION

Hereinafter, various embodiments of the present disclosure will be described with reference to accompanying drawings. Accordingly, those of ordinary skill in the art will recognize that modification, equivalent, and/or alternative on the various embodiments described herein can be variously made without departing from the scope and spirit of the present disclosure.

Figure 1:
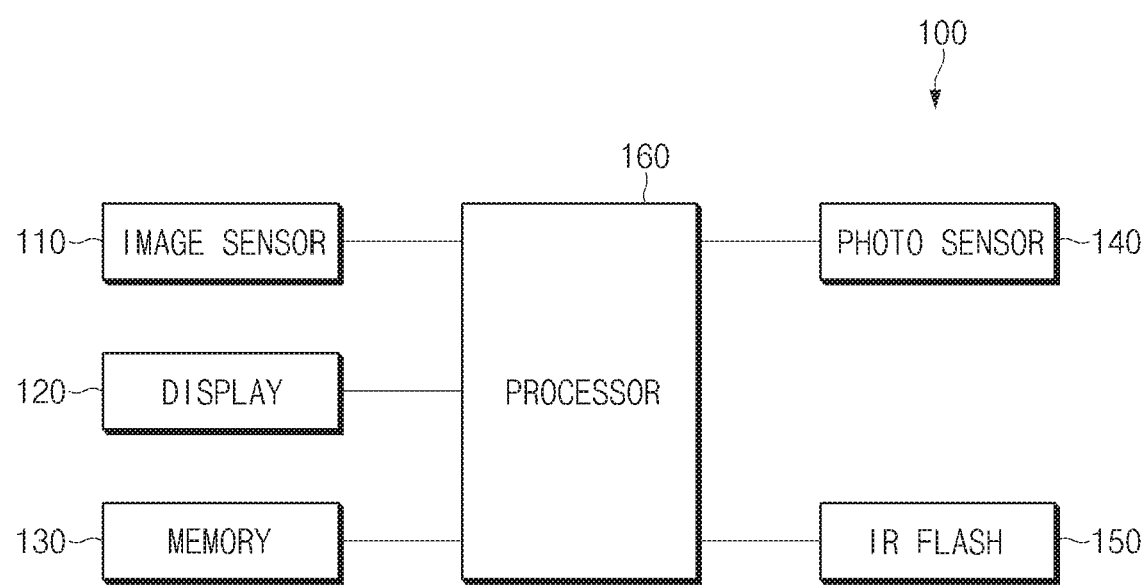
FIG. 1 is a block diagram of an electronic device according to an embodiment.

FIG. 1 is a block diagram of an electronic device according to an embodiment.

Referring to FIG. 1, an electronic device 100 according to an embodiment may include an image sensor 110, a display 120, a memory 130, a photo sensor 140, an IR flash 150, and a processor 160. According to various embodiments, the electronic device 100 may be implemented with some components omitted. For example, the electronic device 100 may be implemented with the display 120, the photo sensor 140, or the IR flash 150 omitted.

The image sensor 110 may generate an electrical signal (e.g., movement of electric charges or current) that is the basis of the image data in response to incident light. According to an embodiment, the image sensor 110 may include a pixel array.

According to an embodiment, the pixel array may include a plurality of pixels.

According to an embodiment, each of the pixels may include an R subpixel, a G subpixel, a B subpixel, and an IR subpixel. According to an embodiment, the R subpixel may receive red light and infrared light, G subpixel may receive green light and infrared light, the B subpixel may receive blue light and infrared light, and the IR subpixel may receive infrared light.

According to an embodiment, the pixel array may include a color filter array. According to an embodiment, the color filter array may include a first region through which visible light and infrared light pass and a second region through which infrared light passes. According to an embodiment, the first region may be a region included in the R subpixel, the G subpixel, and the B subpixel, and the second region may be a region included in the IR subpixel. According to an embodiment, the first region may include a region which transmits red light and infrared light, a region which transmits green light and infrared light, and a region which transmits blue light and infrared light.

According to an embodiment, the image sensor 110 may include an image processor 160, and the image processor 160 may obtain raw image data corresponding to light in an infrared band and a visible light band with respect to an external object.

The display 120 may include, for example, a liquid crystal display (LCD) display 120, an LED display 120, an organic LED (OLED) display 120, or a microelectromechanical systems (MEMS) display 120, or an electronic paper display 120. The display 120 may display, for example, an RGB image generated in real time.

The memory 130 may include a volatile and/or nonvolatile memory 130. The memory 130 may store, for example, commands or data related to at least one other component of the electronic device 100. For example, the memory 130 may store an image data file as a final result processed by the image processor 160. As another example, the memory 130 may store a plurality of applications that provide a function using at least one of an RGB image or an IR image.

The photo sensor 140 may measure at least one of an illuminance or a color temperature corresponding to obtained raw image data. According to an embodiment, the photo sensor 140 may be provided on an outer surface of the electronic device 100.

The IR flash 150 may output infrared light. The IR flash 150 may operate to increase the amount of infrared light reflected from a subject when an IR image is required.

The processor 160 may be electrically connected to the components included in the electronic device 100 to execute operations or data processing related to the control and/or communication of the components included in the electronic device 100.

Figure 2:
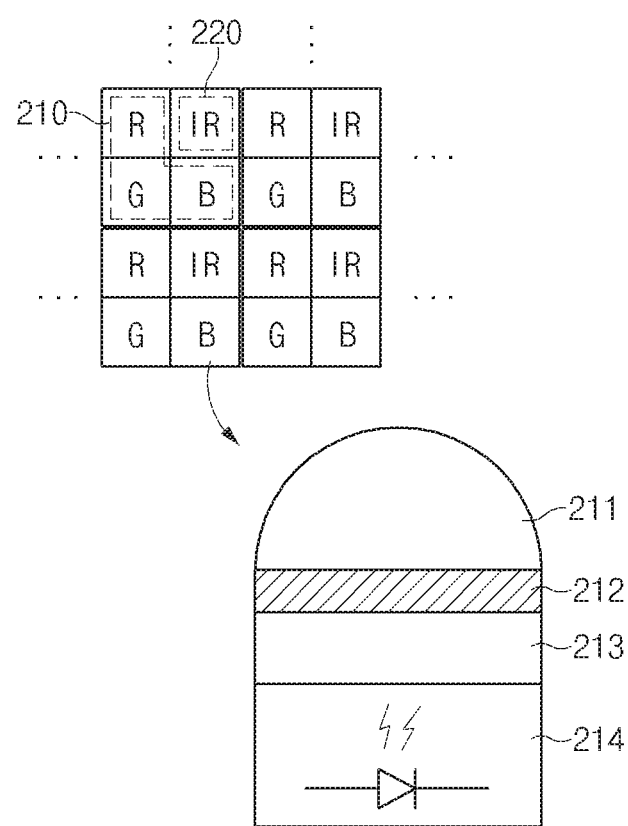
FIG. 2 illustrates a pixel array of an image sensor according to an embodiment.

FIG. 2 illustrates a pixel array of the image sensor 110 according to an embodiment.

According to an embodiment, the pixel array of FIG. 2 may correspond to a pixel array included in the image sensor 110 of FIG. 1.

Referring to FIG. 2, the pixel array may include a plurality of pixels (e.g., millions to tens of millions). According to an embodiment, as illustrated in FIG. 2, each of the pixels may include an R subpixel, a G subpixel, a B subpixel, and an IR subpixel. According to an embodiment, each of the pixels may include a first region 210 which transmits visible light and infrared light and a second region 220 which transmits infrared light. In other words, the image sensor 110 may include a first set of sensor pixels arranged to respond to light passing through a filter configured to transmit at least some light in the infrared band and the visible light band and a second set of sensor pixels arranged to respond to light passing through a filter configured to transmit at least some light in the infrared band and block light in the visible light band.

According to an embodiment, the subpixel may include a micro lens 211, various films or filters 212 and 213, and a photoelectric conversion element 214. Although not shown, according to various embodiments, the subpixel may further include other components such as various conductor patterns that electrically connect the photoelectric conversion element 214 and the image processor 160.

The micro lens 211 may collect incident light such that the incident light reaches a top of the photoelectric conversion element 214. The incident light may be refracted by the micro lens 211 to form a condensed spot (also referred to as an optical spot) on the photoelectric conversion element 214.

The color filter 212 may be disposed under the micro lens 211 to transmit light having a specified color, that is, light having a specified wavelength range. For example, the color filter 213 may include a primary color filter (e.g., R, G, B) and an infrared filter. According to an embodiment, a bundle of color filters may correspond to a color filter array.

The anti-reflection film 213 may increase the amount of light reaching the photoelectric conversion element 214 by preventing light incident through the micro lens 211 from being reflected.

The photoelectric conversion element 214 may correspond to, for example, a photo diode formed on a semiconductor substrate. The photoelectric conversion element 214 may output an electrical signal in response to the incident light according to the photoelectric effect. For example, the photoelectric conversion element 214 may generate electric charges (or current) according to the intensity (or the amount of light) of received light. An output value may be determined based on the amount of the charges (or current).

Figure 3:
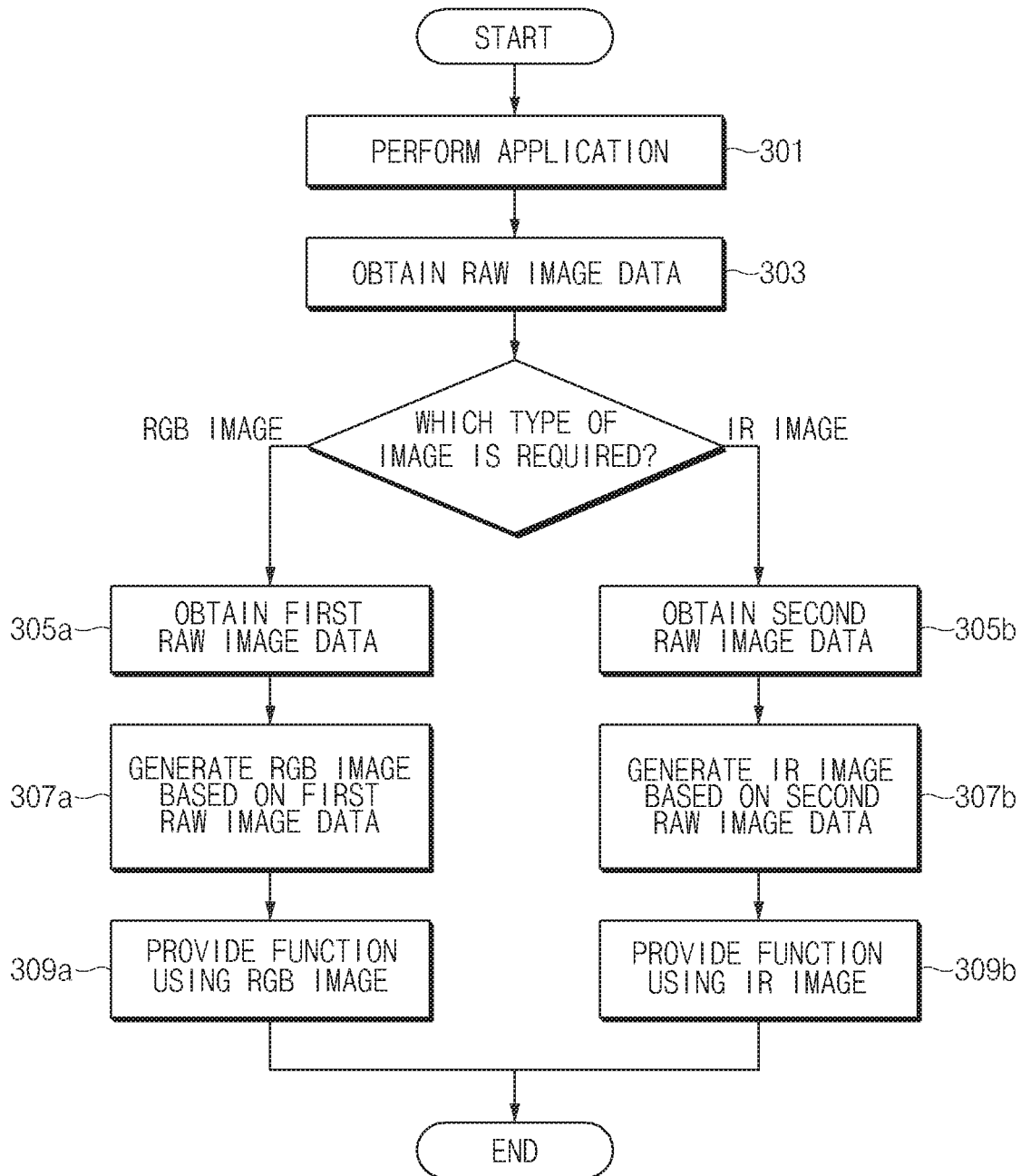
FIG. 3 is a flowchart illustrating a method of providing a function of an application using raw image data according to a type of a required image according to an embodiment.

FIG. 3 is a flowchart illustrating a method of providing a function of an application using raw image data according to a type of a required image according to an embodiment.

Hereinafter, it is assumed that the electronic device 100 of FIG. 1 performs the process of FIG. 3. In addition, in the description of FIG. 3, an operation described as being performed by the electronic device 100 may be understood to be controlled by the processor 160 of the electronic device 100. Operations described as being performed by the electronic device 100 may be implemented as instructions (commands) that may be performed (or executed) by the processor 160 of the electronic device 100. The instructions may be stored in, for example, a computer recording medium or the memory 130 of the electronic device 100 shown in FIG. 1.

In operation 301, the processor 160 may execute any one of a plurality of applications stored in the memory 130.

In operation 303, the processor 160 may obtain raw image data through the image sensor 110. According to an embodiment, the raw image data may include a value according to the magnitude of an electrical signal output by each subpixel of the image sensor 110. For example, the raw image data may have a value according to the magnitude of an electrical signal output by an R subpixel, a value according to the magnitude of an electrical signal output by a G subpixel, a value according to the magnitude of an electrical signal output by a B subpixel, and a value according to the magnitude of an electrical signal output by an IR subpixel.

According to an embodiment, the raw image data may include a first image data set which is data obtained through a first region of a color filter array, which transmits visible light and infrared light and a second image data set which is data obtained through a second region of the color filter array, which transmits infrared light.

When an RGB image is required (in response to a request to obtain an RGB image from an application) to provide a function using the executed application according to one embodiment, in operation 305a, the processor 160 may obtain first raw image data by using the first image data set.

According to an embodiment, the processor 160 may correct an infrared component of the raw image data by further using the second image data set, and obtain first raw image data corresponding to the first region from the corrected raw image data. For example, the first raw image data may be data corresponding to the first region of the color filter array among the corrected raw image data. A detailed description of operations that may be included in operation 305a will be described with reference to FIG. 4.

In operation 307a, the processor 160 may generate an RGB image based on the first raw image data.

According to an embodiment, the processor 160 may obtain third raw image data corresponding to the second region and including a visible light component, an infrared component, or both the visible light component and the infrared component, using the first raw image data.

According to an embodiment, the processor 160 may interpolate the RGB image using the first raw image data and the third raw image data. In other words, when the function requested in relation to the image sensor 110 belongs to a first function, the processor 160 may generate an RGB image related to an external object by using the first raw image data corresponding to the light in the visible light band obtained through the image sensor 110. A detailed description of operations that may be included in operation 307a will be described with reference to FIG. 4.

In operation 309a, the processor 160 may provide a function of using the application by using the generated RGB image. For example, the processor 160 may display an RGB image on the display 120 or store the RGB image in the memory 130.

When an IR image is required to provide the function using the executed application according to one embodiment (in response to a request to obtain an IR image from an application), in operation 305b, the processor 160 may obtain second raw image data by using the second image data set.

According to an embodiment, the processor 160 may correct an infrared component of the raw image data by using the second image data set, and obtain second raw image data corresponding to the second region from the corrected raw image data. For example, the second raw image data may be data corresponding to the second region of the color filter array among the corrected raw image data.

In operation 307b, the processor 160 may generate an IR image based on the second raw image data.

According to an embodiment, the processor 160 may obtain fourth raw image data corresponding to the first region and including an infrared component by using the second raw image data.

According to an embodiment, the processor 160 may interpolate the IR image using the second raw image data and the fourth raw image data.

In operation 309b, the processor 160 may provide a function of using the application by using the generated IR image. For example, the processor 160 may display the IR image on the display 120 or perform biometric authentication (e.g., iris authentication) using the IR image. In other words, when the requested function in relation to the image sensor 110 belongs to a specified second function, the processor 160 may generate an IR image by using the second raw image data corresponding to the light in the infrared light band obtained through the image sensor 110, and perform biometric authentication related to an external object using the generated IR image. According to an embodiment, the processor 160 may obtain distance information (or depth information) between the electronic device 100 and the object using the IR image. For example, the processor 160 may output IR light of a predetermined pattern through the IR flash 150 and obtain distance information to the object by using the IR light of the pattern included in the obtained IR image.

Hereinafter, a detailed operation performed when an RGB image is required to provide a function of an application will be described with reference to FIGS. 4 and 5.

Figure 4:
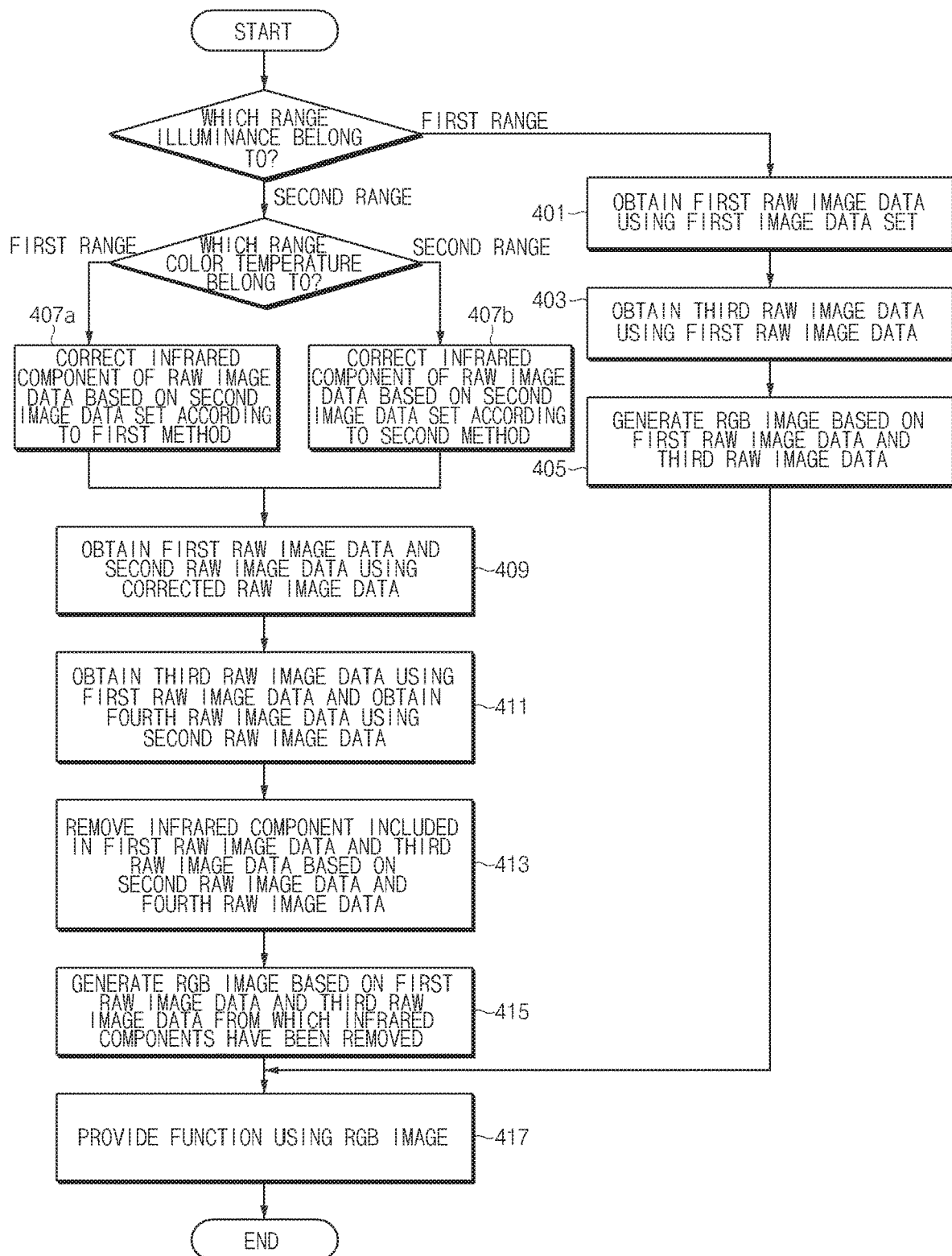
FIG. 4 is a flowchart illustrating a method of correcting an infrared component of raw image data and providing a function of an application using the corrected RGB image, according to an embodiment.

FIG. 4 is a flowchart illustrating a method of correcting an infrared component of raw image data and providing a function of an application using the corrected RGB image, according to an embodiment.

Hereinafter, it is assumed that the electronic device 100 of FIG. 1 performs the process of FIG. 4. In addition, in the description of FIG. 4, an operation described as being performed by the electronic device 100 may be understood to be controlled by the processor 160 of the electronic device 100. Operations described as being performed by the electronic device 100 may be implemented as instructions (commands) that may be performed (or executed) by the processor 160 of the electronic device 100. The instructions may be stored in, for example, a computer recording medium or the memory 130 of the electronic device 100 shown in FIG. 1.

According to an embodiment, the above-described operations 305a to 309a may include operations 401 to 417 of FIG. 4. According to an embodiment, some of operations 401 to 417 may be omitted.

According to an embodiment, operation 401, operation 407a, or operation 407b may be performed after operation 303 of FIG. 3.

According to an embodiment, when an illuminance corresponding to raw image data falls within a first range, in operation 401, the processor 160 may obtain first raw image data using the first image data set. According to an embodiment, the first range may be defined as an illuminance corresponding to the raw image data being lower than a predetermined illuminance. According to an embodiment, the first image data set may be image data obtained through an R subpixel, a G subpixel, and a B subpixel. According to an embodiment, the first image data set may include a visible light component and an infrared component.

In operation 403, the processor 160 may obtain third raw image data corresponding to the second region and including the visible light component and the infrared component using the first raw image data. According to an embodiment, the first raw image data may include a component related to light incident to the first region of the color filter array and may not include a component related to light incident to the second region. The processor 160 may interpolate the third raw image data corresponding to the second region by using the first raw image data. According to an embodiment, the processor 160 may obtain RGB image data corresponding to all regions of a color filter array by obtaining the third raw image data.

In operation 405, the processor 160 may generate an RGB image based on the first raw image data and the third raw image data. According to an embodiment, the processor 160 may interpolate the RGB image by using the first raw image data and the third raw image data. For example, the processor 160 may demosaic the first raw image data and the third raw image data to generate the RGB image.

According to an embodiment, when the illuminance corresponding to the raw image data falls within the second range, in operation 407a or 407b, the processor 160 may correct an infrared component of the raw image data based on the second image data set. According to an embodiment, the first range may be defined as an illuminance corresponding to the raw image data being equal to or higher than a predetermined illuminance.

In other words, when the illuminance corresponding to the raw image data falls within the first range, the processor 160 may generate an RGB image using the first image data set. In addition, when the illuminance corresponding to the raw image data falls within a specified second range, the processor 160 may generate an RGB image in which a component corresponding to the infrared light band in the first image data set is corrected using at least some of the second image data set.

According to an embodiment, it is possible to obtain an RGB image of an improved quality even in a low illuminance environment by obtaining the RGB image including an IR component.

According to various embodiments, the processor 160 may obtain an RGB image including an IR component to provide various functions as well as when illumination is low (operation 401, operation 403 and operation 405). For example, the processor 160 may obtain an RGB image including an IR component to smooth the texture of human skin to be photographed. As another example, the processor 160 may obtain an RGB image including an IR component to optimize a dynamic range of the RGB image. As another example, the processor 160 may obtain an RGB image including an IR component to obtain an effect of removing fog from the RGB image.

According to an embodiment, when the color temperature corresponding to the raw image data falls within the first range, in operation 407a, the processor 160 may correct an IR component of the raw image data based on the second image data set according to a first method. According to one embodiment, the first range may be defined as a color temperature corresponding to the raw image data being lower than a predetermined color temperature.

According to an embodiment, when the color temperature corresponding to the raw image data falls within the second range, in operation 407b, the processor 160 may correct an IR component of the raw image data based on the second image data set according to a second method different from the first method. According to one embodiment, the second range may be defined as a color temperature corresponding to the raw image data being equal to or higher than a predetermined color temperature.

In other words, the processor 160 may correct the infrared component of the raw data image in a method determined according to the color temperature of the raw image data.

According to an embodiment, the processor 160 may perform correction by subtracting a value obtained by multiplying a value of an IR component obtained through an IR pixel by a predetermined coefficient corresponding to a type of the RGB subpixel included in the pixel from a value of an RGB component obtained through the RGB subpixel. For example, the raw image data may include a value of a component corresponding to an R subpixel, a value of a component corresponding to a G subpixel, a value of a component corresponding to a B subpixel, and a value of a component corresponding to an IR subpixel, which correspond to one pixel. In an embodiment, the value of the component corresponding to the R subpixel may be 3, the value of the component corresponding to the G subpixel may be 3.5, the value of the component corresponding to the B subpixel may be 4, and the value of the component corresponding to the IR subpixel may be 1. In addition, the coefficient corresponding to the R subpixel may be 1.24, the coefficient corresponding to the G subpixel may be 1.03, and the coefficient corresponding to the B subpixel may be 0.84.

In an embodiment, the processor 160 may correct the value of the component corresponding to the R subpixel to be 1.76 (=3−1.24×1), correct the value of the component corresponding to the G subpixel to be 2.47 (=3.5−1.03×1), and correct the value of the component corresponding to the B subpixel to be 3.16 (=4−0.84×1).

In other words, the processor 160 may correct at least a part of the second image data set using a first parameter when the color temperature corresponding to the raw image data falls within the first range, and at least a part of the second image data set using a second parameter when the color temperature falls within the second range. The processor 160 may correct a component corresponding to the infrared band in the first image data set by using at least a part of the corrected second image data set.

According to an embodiment, the processor 160 may correct a component corresponding to the infrared light of the raw image data based further on at least a part of the first image data set.

For example, the processor 160 may correct an infrared component of the raw image data by using the following matrix formula.

$$\begin{bmatrix} R' \\ G' \\ B' \\ IR' \end{bmatrix} = \begin{bmatrix} a & b & c & d \\ e & f & g & h \\ i & j & k & l \\ m & n & o & p \end{bmatrix} * \begin{bmatrix} R \\ G \\ B \\ IR \end{bmatrix} \quad \text{Formula 1}$$

According to an embodiment, R', G', B', and IR' in the matrix may be respectively a value of a component corresponding to an R subpixel, a value of a component corresponding to a G subpixel, a value of a component corresponding to a B subpixel and a value of a component corresponding to an IR subpixel, which are included in the corrected raw image data. According to an embodiment, R, G, B, and IR in the matrix may be respectively a value of a component corresponding to an R subpixel, a value of a component corresponding to a G subpixel, a value of a component corresponding to a B subpixel and a value of a component corresponding to an IR subpixel, which are included in the raw image data before correction.

According to one embodiment, $$\begin{bmatrix} a & b & c & d \\ e & f & g & h \\ i & j & k & l \\ m & n & o & p \end{bmatrix} = \begin{bmatrix} 0.38 & 0.44 & -0.33 & -0.52 \\ -0.18 & 1.36 & -0.09 & -0.98 \\ 0.19 & -0.06 & 1.17 & -1.19 \\ 0.08 & 0.05 & 0.027 & -0.16 \end{bmatrix}$$

may be possible.

As another example, the processor 160 may correct an infrared component of the raw image data by using the following matrix formula.

$$\begin{bmatrix} R' \\ G' \\ B' \\ IR' \end{bmatrix} = [4 \times 11] * \begin{bmatrix} R \\ G \\ B \\ IR \\ R^2 \\ G^2 \\ B^2 \\ IR^2 \\ R*IR \\ G*IR \\ B*IR \end{bmatrix} \quad \text{Formula 2}$$

According to an embodiment, R', G', B', and IR' in the matrix may be respectively a value of a component corresponding to an R subpixel, a value of a component corresponding to a G subpixel, a value of a component corresponding to a B subpixel and a value of a component corresponding to an IR subpixel, which are included in the corrected raw image data. According to an embodiment, R, G, B, and IR in the matrix may be respectively a value of a component corresponding to an R subpixel, a value of a component corresponding to a G subpixel, a value of a component corresponding to a B subpixel and a value of a component corresponding to an IR subpixel, which are included in the raw image data before correction.

According to an embodiment, when the color temperature of the raw image data falls within the first range (e.g., the color temperature range of fluorescent light), the processor 160 may perform correction using the first method (e.g., using a correction method of subtracting a value obtained by multiplying a value of an IR component obtained through an IR pixel by a predetermined coefficient corresponding to a type of an RGB subpixel included in the pixel from a value of an RGB component obtained through the RGB subpixel) of the above-described correction methods, and when the color temperature of the raw image data falls within the second range (e.g., the color temperature range of the incandescent light), perform correction using the second method of the above-described correction methods (e.g., a method of correcting an infrared component of the raw image data using the matrix formula).

According to various embodiments, the processor 160 may further use an infrared correction method that is not described as an example.

In operation 409, the processor 160 may obtain first raw image data by using at least a part of the corrected raw image data. According to an embodiment, the first raw image data that is raw image data corresponding to a first region of the corrected raw image data may be obtained. For example, the corrected raw image data as described above may include a value R' of a component corresponding to an R subpixel, a value G' of a component corresponding to a G subpixel, a value B' of a component corresponding to a B subpixel, and a value IR' of the component corresponding to an IR subpixel. The processor 160 may obtain the value R' of the component corresponding to the R subpixel corresponding to the first region, the value G' of the component corresponding to the G subpixel corresponding to the first region, and the value B' of the component corresponding to the B subpixel corresponding to the first region, among the values of the plurality of components.

In operation 411, the processor 160 may obtain third raw image data corresponding to the second region and including a visible light component and an infrared component using the first raw image data, and obtain fourth raw image data corresponding to the first region and including an infrared component using the second raw image data.

According to an embodiment, the first raw image data may include a component related to light incident to the first region of the color filter array and may not include a component related to light incident to the second region. The processor 160 may interpolate the third raw image data corresponding to the second region by using the first raw image data. According to an embodiment, the processor 160 may obtain RGB image data corresponding to all regions of a color filter array by obtaining the third raw image data.

According to an embodiment, the second raw image data may include a component related to light incident to the second region of the color filter array and may not include a component related to light incident to the first region. The processor 160 may interpolate the fourth raw image data corresponding to the first region by using the second raw image data. According to an embodiment, the processor 160 may obtain IR image data corresponding to all regions of a color filter array by obtaining the fourth raw image data.

Figure 5:
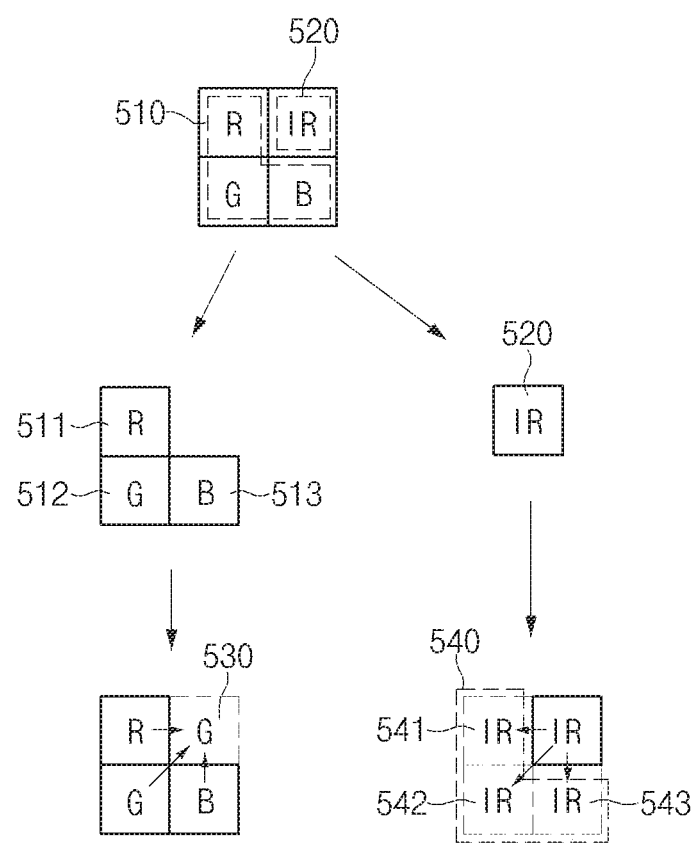
FIG. 5 is a diagram illustrating a process of obtaining third raw image data and fourth raw image data by using a part of raw image data according to an embodiment.

FIG. 5 is a diagram illustrating a process of obtaining third raw image data and fourth raw image data by using a part of raw image data according to an embodiment.

Referring to FIG. 5, corrected raw image data may include a value 510 of a component corresponding to a first region and a value 520 of a component corresponding to a second region. The processor 160 may obtain first raw image data including a value 511 of a component corresponding to an R subpixel, a value 512 of a component corresponding to a G subpixel, and a value 513 of a component corresponding to a B subpixel, and obtain second raw image data including the value 520 of a component corresponding to an IR subpixel.

According to an embodiment, the processor 160 may interpolate third raw image data 530 corresponding to the second region using the first raw image data. Although the use of values of three components is illustrated in FIG. 5, there may be a plurality of neighboring other pixels of the illustrated pixel, and the processor 160 may interpolate the third raw image data 530 using the first raw image data corresponding to the other neighboring pixels.

According to an embodiment, the processor 160 may interpolate the third raw image data 530 using the value 512 of the component corresponding to the G subpixel as it is. According to an embodiment, the processor 160 may process values of components corresponding to neighboring subpixels according to a predetermined algorithm, and interpolate the third raw image data 530 using the processed values. For example, the processor 160 may interpolate the third raw image data 530 by using the value 512 of the component corresponding to the G subpixel and an average value of the values of the components corresponding to the G subpixels of the neighboring other pixels.

According to an embodiment, the processor 160 may interpolate the fourth raw image data 540 corresponding to the first region using the second raw image data. Although the use of value of one component is illustrated in FIG. 5, there may be a plurality of neighboring other pixels of the illustrated pixel, and the processor 160 may interpolate the fourth raw image data 540 using the second raw image data corresponding to the neighboring other pixels. According to an embodiment, the fourth raw image data 540 may include a value 541 of a component corresponding to the R subpixel, a value 542 of a component corresponding to the G subpixel, and a value 543 of a component corresponding to the B subpixel.

According to an embodiment, the processor 160 may interpolate the fourth raw image data 540 using the second raw image data 520 as it is. According to an embodiment, the processor 160 may process values of components corresponding to IR subpixels included in neighboring pixels according to a predetermined algorithm, and interpolate the fourth raw image data 540 using the processed values. For example, the processor 160 may interpolate the fourth raw image data 540 using an average value of values of components corresponding to the IR subpixels of the neighboring pixels.

Referring back to FIG. 4, in operation 413, the processor 160 may remove infrared components included in the first raw image data and the third raw image data based on the second raw image data and the fourth raw image data.

According to an embodiment, the first raw image data and the third raw image data may include visible light components and infrared components, and the second raw image data and fourth raw image data may include only infrared components. According to an embodiment, the processor 160 may remove infrared components by subtracting a value of a component corresponding to each subpixel included in the second raw image data and the fourth raw image data from in a value of a component corresponding to each subpixel included in the first raw image data and the third raw image data. For example, the processor 160 may subtract the value of the component corresponding to the R subpixel of the fourth raw image data from the value of the component corresponding to the R subpixel of the first raw image data.

In operation 415, the processor 160 may generate an RGB image based on the first raw image data and the third raw image data from which the infrared components have been removed. According to an embodiment, the processor 160 may interpolate the RGB image by using the first raw image data and the third raw image data from which the infrared components have been removed. For example, the processor 160 may demosaic the first raw image data and the third raw image data from which the infrared components have been removed to generate an RGB image.

In operation 417, the processor 160 may provide a function of an application using the RGB image. For example, when the application is a camera application, the processor 160 may display an RGB image obtained in real time on the display 120 and store a still image or a moving image in the memory 130 according to a user input.

In the above description with reference to FIG. 4, it has been described that a range of illuminance corresponding to the raw image data is determined, and a range of color temperature corresponding to the raw image data is then determined. According to an embodiment, only a range of illuminance corresponding to the raw image data may be determined or only a range of color temperature may be determined.

For example, regardless of which range the illuminance corresponding to the raw image data belongs to, when the range of color temperature falls within the first range, the processor may perform operation (operation 407a) of correcting the infrared component of the raw image data based on the second image data set according to the first method, and perform operation (operation 407b) of correcting the infrared component of the raw image data based on the second image data set according to the second method when the range of the color temperature temperature falls within the second range.

As another example, regardless of which range the color temperature corresponding to the raw image data belongs to, the processor may perform operation (operation 401) of obtaining first raw image data using the first image data set when the range of illuminance falls within the first range and perform operation (operation 407a or operation 407b) of correcting an infrared component of the raw image data based on the second image data set when the range of illuminance falls within the second range.

Hereinafter, a detailed operation performed when an IR image is required to provide a function of an application (in response to a request to obtain the IR image from the application) is described with reference to FIG. 6.

Figure 6:
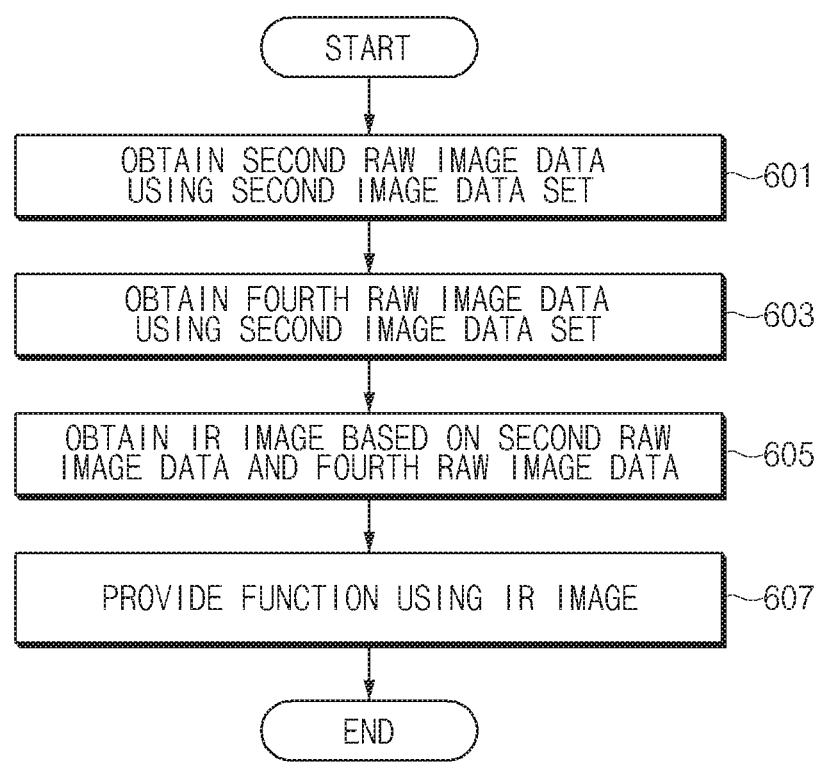
FIG. 6 is a flowchart illustrating a method of providing a function of an application using an IR image according to an embodiment.

FIG. 6 is a flowchart illustrating a method of providing a function of an application using an IR image according to an embodiment.

Hereinafter, it is assumed that the electronic device 100 of FIG. 1 performs the process of FIG. 6. In addition, in the description of FIG. 6, an operation described as being performed by the electronic device 100 may be understood to be controlled by the processor 160 of the electronic device 100. Operations described as being performed by an electronic device 100 may be implemented as instructions (commands) that may be performed (or executed) by the processor 160 of the electronic device 100. The instructions may be stored in, for example, a computer recording medium or the memory 130 of the electronic device 100 shown in FIG. 1.

According to an embodiment, the above-described operations 305b to 309b may include operations 601 to 607 of FIG. 6. According to an embodiment, some of operations 601 to 607 may be omitted.

According to an embodiment, operation 601 may be performed after operation 303 of FIG. 3.

According to an embodiment, before operation 303, the processor 160 may output IR light through the IR flash 150.

In operation 601, the processor 160 may obtain second raw image data using a second image data set. According to an embodiment, the second image data set may be image data obtained through an IR pixel. According to an embodiment, the second image data set may include an infrared component.

In operation 603, the processor 160 may obtain fourth raw image data corresponding to a first region and including an infrared component by using the second raw image data. According to an embodiment, the second raw image data may include a component related to light incident to the second region of the color filter array and may not include a component related to light incident to the first region. The processor 160 may interpolate the fourth raw image data corresponding to the first region by using the second raw image data. According to an embodiment, the processor 160 may obtain RGB image data corresponding to all regions of the color filter array by obtaining fourth raw image data. A detailed method of obtaining the fourth raw image data by the processor 160 is the same as described above with reference to FIG. 5.

In operation 605, the processor 160 may generate an IR image based on the second raw image data and the fourth raw image data. According to an embodiment, the processor 160 may interpolate the IR image by using the second raw image data and the fourth raw image data. For example, the processor 160 may demosaic the second raw image data and the fourth raw image data to generate an IR image.

In operation 607, the processor 160 may provide a function of an application using the IR image. For example, when the application is an iris authentication application, the processor 160 may perform iris authentication by comparing an iris pattern included in the obtained IR image with an iris pattern stored in the memory 130.

According to an embodiment, the processor 160 may generate an RGB image according to the method described with reference to FIG. 4. According to an embodiment, the processor 160 may display the generated RGB image on the display 120, and provide a function using the IR image while the RGB image is displayed on the display 120. A detailed embodiment thereof will be described with reference to FIG. 7.

Figure 7:
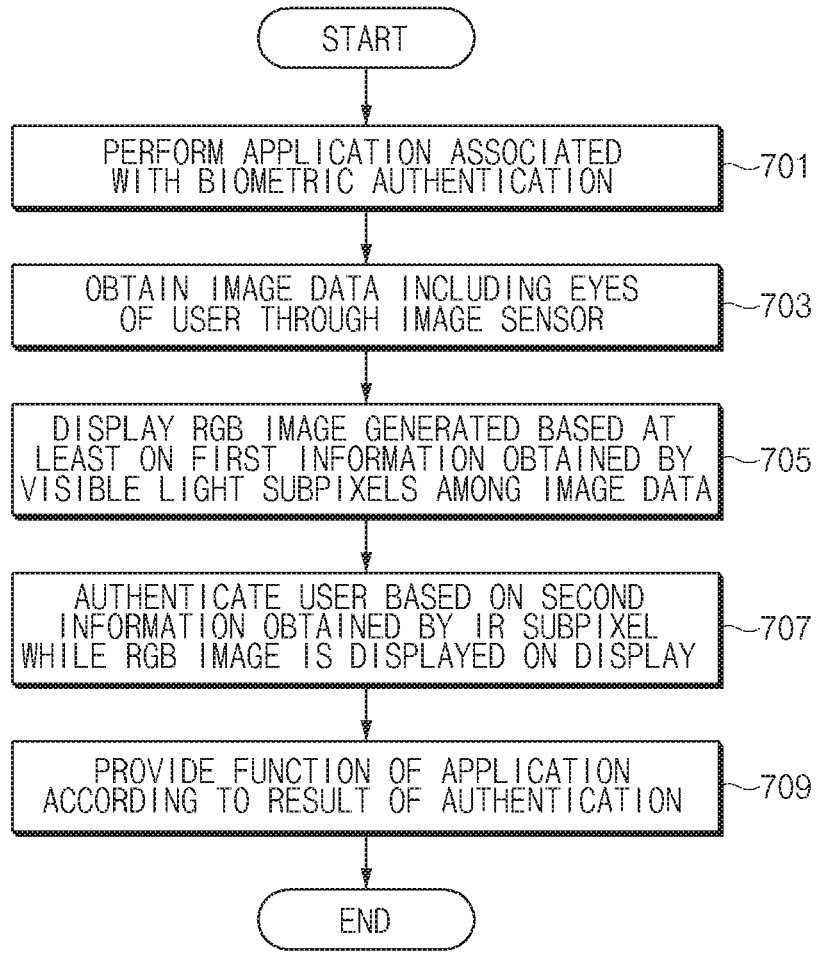
FIG. 7 is a flowchart illustrating a method of performing biometric authentication using an IR image while displaying an RGB image, according to an embodiment.

FIG. 7 is a flowchart illustrating a method of performing biometric authentication using an IR image while displaying an RGB image, according to an embodiment.

Hereinafter, it is assumed that the electronic device 100 of FIG. 1 performs the process of FIG. 7. In addition, an operation described as being performed by the electronic device 100 with reference to FIG. 7 may be understood as being controlled by the processor 160 of the electronic device 100.

Operations described as being performed by an electronic device 100 may be implemented as instructions (commands) that may be performed (or executed) by the processor 160 of the electronic device 100. The instructions may be stored in, for example, a computer recording medium or the memory 130 of the electronic device 100 shown in FIG. 1.

In operation 701, the processor 160 may execute an application associated with biometric authentication. For example, the processor 160 may execute a card payment application that authenticates a user according to a biometric authentication method. According to an embodiment, biometric authentication may correspond to iris recognition.

In operation 703, the processor 160 may obtain image data including eyes of a user through the image sensor 110. According to an embodiment, the processor 160 may output infrared light through the IR flash 150 before operation 703. According to an embodiment, the processor 160 may continuously output infrared light through the IR flash 150 until user authentication is completed.

In operation 705, the processor 160 may display, on the display 120, at least a portion of an RGB image generated based at least on first information obtained by an R subpixel, a G subpixel, and a B subpixel of the image data.

According to an embodiment, the first information may include first image data set, first raw image data, or corrected first raw image data which are described above. According to an embodiment, the processor 160 may generate an RGB image according to the method described above with reference to FIG. 4, and display at least a portion of the generated RGB image on the display 120.

In operation 707, the processor 160 may authenticate a user based on second information obtained by the IR subpixel while the generated RGB image is displayed on the display 120.

According to an embodiment, the second information may include second image data set, second raw image data, or corrected second raw image data which are described above. According to an embodiment of the present disclosure, the processor 160 may generate an IR image by the method described above with reference to FIG. 6. According to an embodiment, the second information may include iris image data obtained from the eyes of the user.

According to an embodiment, the processor 160 may perform user authentication by comparing the obtained iris image data with iris image data stored in the memory 130.

In operation 709, the processor 160 may provide a function of an application according to a result of the user authentication. For example, when the user authentication is successful, the processor 160 may perform card payment.

According to an embodiment, the processor 160 may output flicking of infrared light through the IR flash 150.

According to an embodiment, in operation 705, the processor 160 may display, on the display 120, at least a portion of the RGB image generated based at least on the first information obtained by the R subpixel, the G subpixel, and the B subpixel of the image data corresponding to a time point at which the infrared light is not output. According to an embodiment, in operation 707, the processor 160 may authenticate the user based on the second information obtained by the IR subpixel of the image data corresponding to the time point at which the infrared light is output.

Figure 8:
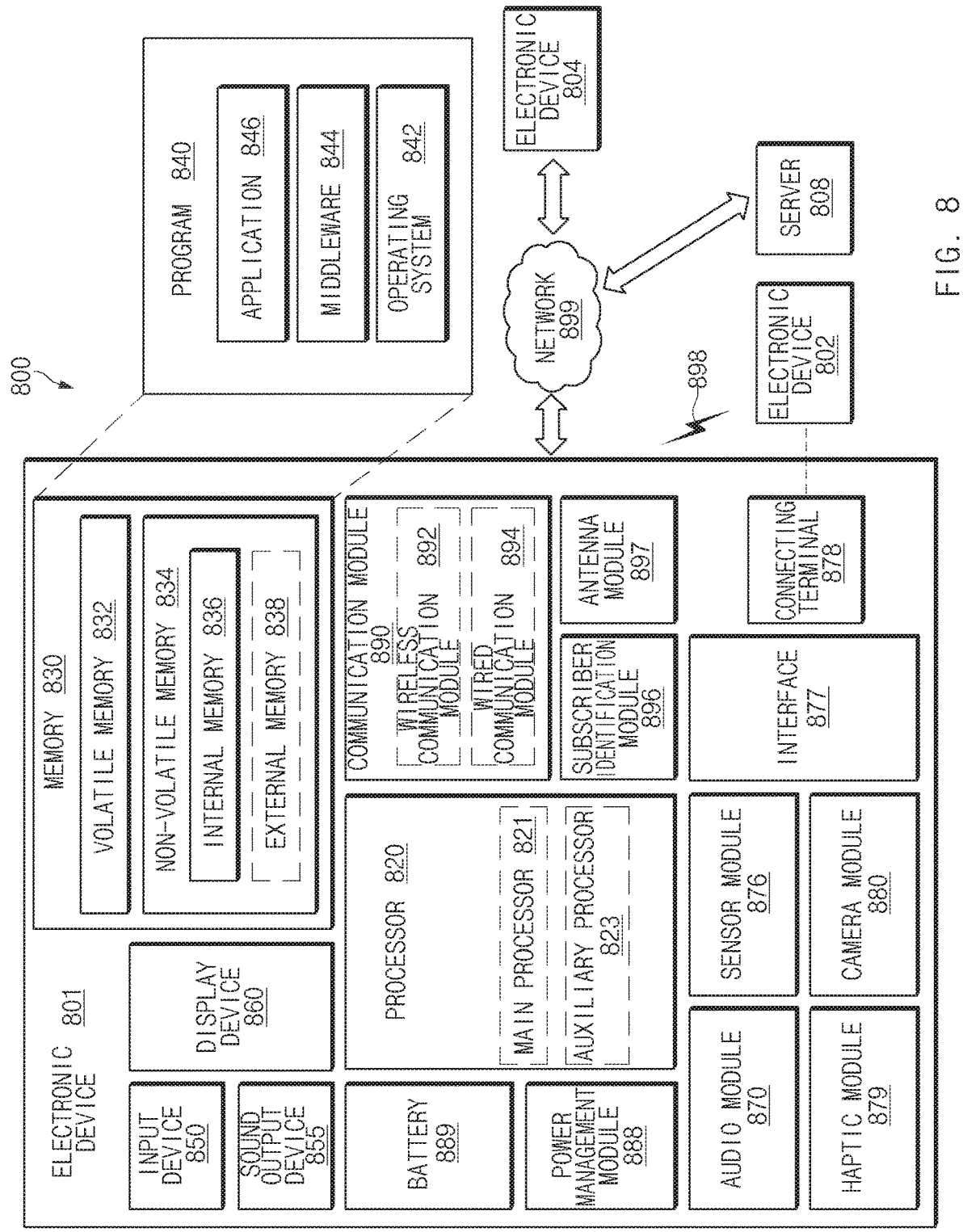
FIG. 8 is a block diagram of an electronic device in a network environment according to various embodiments.

FIG. 8 is a block diagram of an electronic device in a network environment according to various embodiments.

Referring to FIG. 8, an electronic device 801 may communicate with an electronic device 802 through a first network 898 (e.g., a short-range wireless communication) or may communicate with an electronic device 804 or a server 808 through a second network 899 (e.g., a long-distance wireless communication) in a network environment 800. According to an embodiment, the electronic device 801 may communicate with the electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user of the electronic device 801 and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a WiFi direct, or an IrDA (infrared data association)) or the second network 899 (e.g., the long-distance wireless communication network such as a cellular network, an internet, or a computer network (e.g., LAN or WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or MIPI (mobile industry processor interface)) used between peripheral devices to exchange signals (e.g., a command or data) with each other.

According to an embodiment, the command or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

Figure 9:
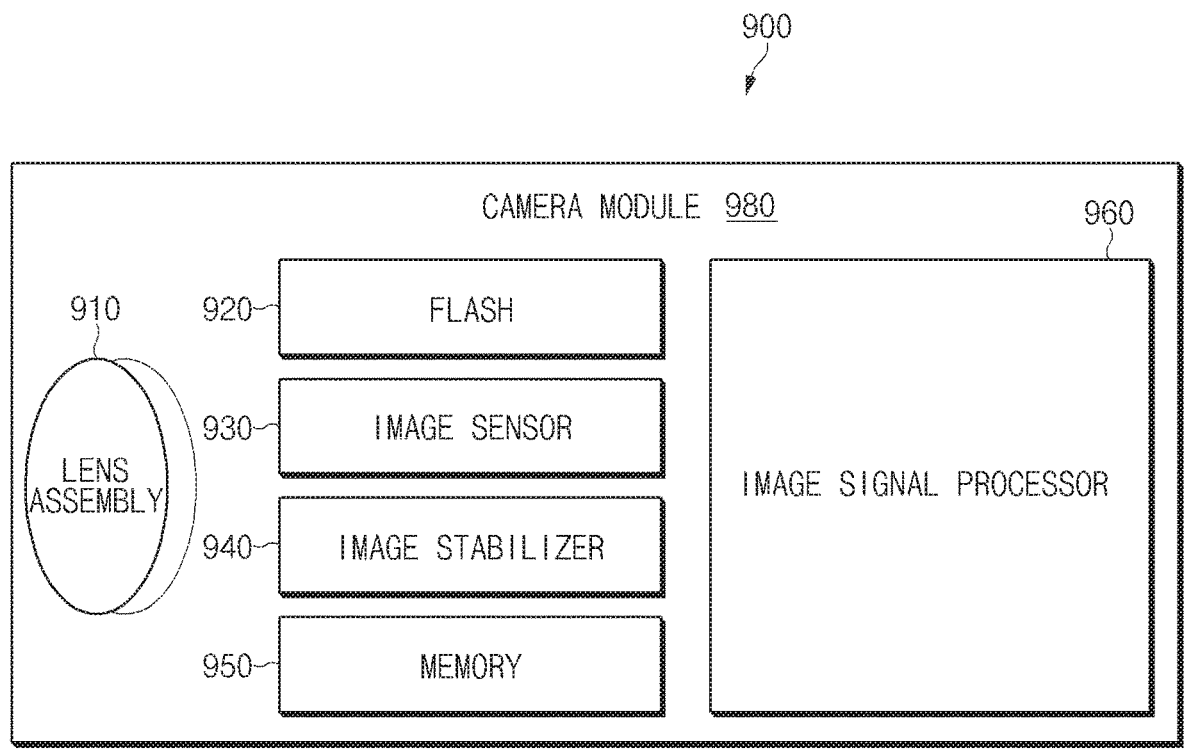
FIG. 9 is a block diagram illustrating the camera module according to various embodiments.

FIG. 9 is a block diagram 900 illustrating the camera module 880 according to various embodiments. Referring to FIG. 9, the camera module 880 may include a lens assembly 910, a flash 920, an image sensor 930, an image stabilizer 940, memory 950 (e.g., buffer memory), or an image signal processor 960. The lens assembly 910 may collect light emitted or reflected from an object whose image is to be taken. The lens assembly 910 may include one or more lenses. According to an embodiment, the camera module 880 may include a plurality of lens assemblies 910. In such a case, the camera module 880 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes different from those of another lens assembly. The lens assembly 910 may include, for example, a wide-angle lens or a telephoto lens.

The flash 920 may emit light that is used to reinforce light reflected from an object. According to an embodiment, the flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to an embodiment, the image sensor 930 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 940 may move the image sensor 930 or at least one lens included in the lens assembly 910 in a particular direction, or control an operational attribute (e.g., adjust the read-out timing) of the image sensor 930 in response to the movement of the camera module 880 or the electronic device 801 including the camera module 880. This allows compensating for at least part of a negative effect (e.g., image blurring) by the movement on an image being captured. According to an embodiment, the image stabilizer 940 may sense such a movement by the camera module 880 or the electronic device 801 using a gyro sensor (not shown) or an acceleration sensor (not shown) disposed inside or outside the camera module 880. According to an embodiment, the image stabilizer 940 may be implemented, for example, as an optical image stabilizer.

The memory 950 may store, at least temporarily, at least part of an image obtained via the image sensor 930 for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display device 860. Thereafter, if a specified condition is met (e.g., by a user's input or system command), at least part of the raw image stored in the memory 950 may be obtained and processed, for example, by the image signal processor 960. According to an embodiment, the memory 950 may be configured as at least part of the memory 830 or as a separate memory that is operated independently from the memory 830.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 880. An image processed by the image signal processor 960 may be stored back in the memory 950 for further processing, or may be provided to an external component (e.g., the memory 830, the display device 860, the electronic device 802, the electronic device 804, or the server 808) outside the camera module 880. According to an embodiment, the image signal processor 960 may be configured as at least part of the processor 820, or as a separate processor that is operated independently from the processor 820. If the image signal processor 960 is configured as a separate processor from the processor 820, at least one image processed by the image signal processor 960 may be displayed, by the processor 820, via the display device 860 as it is or after being further processed.

According to an embodiment, the electronic device 801 may include a plurality of camera modules 880 having different attributes or functions. In such a case, at least one of the plurality of camera modules 880 may form, for example, a wide-angle camera and at least another of the plurality of camera modules 880 may form a telephoto camera. Similarly, at least one of the plurality of camera modules 880 may form, for example, a front camera and at least another of the plurality of camera modules 880 may form a rear camera.

According to an embodiment disclosed therein, an electronic device may include an image sensor that obtains raw image data corresponding to light in an infrared band and a visible band for an external object and a processor, wherein the processor may receive a request to obtain the raw image data corresponding to the external object, generate an RGB image associated with the external object using first raw image data corresponding to the light in the visible band obtained through the image sensor, based on the request being set to be performed using a first function of the image sensor, and perform biometric authentication associated with the external object using second raw image data corresponding to the light in the infrared band obtained through the image sensor, based on the request being set to be performed using a second function of the image sensor.

According to an embodiment, the image sensor may include a first sensor pixel set arranged to respond to light passing through a filter configured to transmit at least a part of the light in the infrared band and the visible band and a second sensor pixel set arranged to respond to light passing through a filter configured to transmit at least a part of the light in the infrared band and block the light in the visible band, and the processor may obtain raw image data including a first image data set obtained through the first sensor pixel set and a second image data set obtained through the second sensor pixel set, using the image sensor, and obtain the first image data or the second raw image data using at least a part of the raw image data.

According to an embodiment, the processor may, as a part of an operation of generating the RGB image, generate the RGB image using the first image data set based on an illuminance corresponding to the raw image data satisfying a specified first range, and generate the RGB image in which a component corresponding to the infrared band is corrected in the first image data set using at least a part of the second image data set based on the illuminance satisfying a specified second range.

According to an embodiment, the processor may, as a part of an operation of generating the RGB image, correct at least a part of the second image data set using a first parameter based on a color temperature corresponding to the raw image data satisfying a specified first range, and correct at least a part of the second image data set using a second parameter based on the color temperature satisfying a specified second range, and generate the RGB image in which a component corresponding to the infrared band is corrected in the first image data set using at least a part of the corrected second image data set.

According to an embodiment, the processor may, as a part of an operation of generating the RGB image, correct at least a part of the second image data set using the first parameter, using at least a part of the corrected second image data set according to a color temperature corresponding to the raw image data satisfying a color temperature range of fluorescent light, and generate the RGB image in which a component corresponding to the infrared band is corrected in the first image data set using the at least a part of the second image data set which is corrected and correct at least a part of the first image data set and at least a part of the second image data set using the second parameter according to a color temperature corresponding to the raw image data satisfying a color temperature range of incandescent light, and generate the RGB image in which a component corresponding to the infrared band is corrected in the first image data set using the at least a part of the first image data set and the at least a part of the second image data set which are corrected.

Furthermore, according to an embodiment disclosed therein, an electronic device may include an image sensor including a color filer array, the color filter array including a first region transmitting visible light and infrared light and a second region transmitting infrared light, a memory, and a processor electrically connected to the image sensor, the display, and the memory, wherein the processor may execute an application, obtain first raw image data using a first image data set corresponding to the first region among raw image data obtained through the image sensor in response to a request to obtain an RGB image from the application, and provide the RGB image generated based at least on the obtained first raw image data to the application, and obtain second raw image data using a second image data set corresponding to the second region among raw image data obtained through the image sensor in response to a request to obtain an IR image from the application, and provide the IR image generated based at least on the obtained second raw image data to the application.

According to an embodiment, the first region may include a region transmitting red light and infrared light, a region transmitting green light and infrared light and a region transmitting blue light and infrared light.

According to an embodiment, the processor may obtain the first raw image data using the first image data set according to an illuminance corresponding to the raw image data falling within a first range, and obtain the first raw image data using at least a part of the raw image data in which a component corresponding to infrared light included in the raw image data is corrected based at least on the second image data set according to the illuminance corresponding to the raw image data falling within a second range.

According to an embodiment, the first range may be defined as being lower than a predetermined illuminance and the second range may be defined as being higher than or equal to the predetermined illuminance According to an embodiment, the processor may correct a component of the raw image data corresponding to the infrared light based at least on the second image data set using a first method according to a color temperature corresponding to the raw image data falling within a first range, correct a component of the raw image data corresponding to the infrared light based at least on the second image data set using a second method different from the first method according to a color temperature corresponding to the raw image data falling within a second range, and obtain the first raw image data using at least a part of the corrected raw image data.

According to an embodiment, the processor may correct a component of the raw image data corresponding to the infrared light further based on at least a part of the first image data set.

According to an embodiment, the first range may be defined as being lower than a predetermined color temperature and the second range may be defined as being higher than or equal to the predetermined color temperature.

According to an embodiment, the processor may further obtain third raw image data corresponding to the second region and including a visible light component and an infrared component based on the first raw image data in response to the request to obtain the RGB image, and remove an infrared component included in the first raw image data and the third raw image data based on the second raw image data, and wherein the RGB image is generated based on the first raw image data and the third raw image data.

According to an embodiment, the processor may further obtain fourth raw image data corresponding to the first region and including an infrared component based on the second raw image data in response to the request to obtain the IR image, and the IR image may be generated based on the second raw image data and the fourth raw image data.

According to an embodiment, the electronic device may further include a display, and the processor may obtain the first raw image data using the first image data set corresponding to the first region among the raw image data obtained through the image sensor in response to the request to obtain the IR image, and display the RGB image generated based at least on the obtained first raw image data on the display, and provide the IR image to the application while the RGB image is displayed on the display.

Furthermore, according to an embodiment disclosed herein, an electronic device may include an image sensor, the image sensor including a pixel array, the pixel array including a plurality of pixels, each of the pixels including an R subpixel, a G subpixel, a B subpixel, and an IR subpixel, a display, a memory that stores instructions, and a processor electrically connected to the image sensor, the display and the memory, wherein the processor may execute instructions to perform an application associated with biometric authentication, obtain image data including eyes of a user through the image sensor, display, on the display, at least a portion of an RGB image generated based at least on first information obtained by the R subpixel, the G subpixel and the B subpixel among the image data, authenticate the user based on second information obtained by the IR subpixel while the generated RGB image is displayed on the display, and provide a function of the application according to a result of the authentication.

According to an embodiment, the second information may include iris image data obtained from the eyes of the user and the biometric authentication corresponds to iris authentication.

According to an embodiment, the electronic device may further include an IR flash, and the processor may execute the instructions to output flickering of infrared light through the IR flash, display, on the display, at least a part of the RGB image generated based at least on the first information obtained by the R subpixel, the G subpixel and the B subpixel among the image data corresponding to a time point at which the infrared light is not output and authenticate the user based on the second information obtained by the IR subpixel among the image data at a time point at which the infrared light is output.

According to an embodiment, the processor may execute the instructions to correct an infrared component included in the first information based at least on the second information and display, on the display, at least a portion of the RGB image generated based at least on the first information in which the infrared component is corrected.

According to an embodiment, the processor may execute the instructions to correct the infrared component included in the first information based at least on the second information according to a first method when a color temperature corresponding to the image data falls within a first range and correct the infrared component included in the first information based at least on the second information according to a second method different from the first method when the color temperature corresponding to the image data falls within a second range.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
an image sensor configured to obtain raw image data corresponding to light in an infrared band and a visible band for an external object; and
a processor,
wherein the processor is configured to:
receive a request to obtain the raw image data corresponding to the external object,
generate a red-green-blue (RGB) image associated with the external object using first raw image data by the processor being further configured to obtain the first raw image data using a first image data set corresponding to a first region among raw image data obtained through the image sensor, according to an illuminance corresponding to the raw image data falling within a first range,
obtain the first raw image data using at least a part of the raw image data in which a component corresponding to infrared light included in the raw image data is corrected in the first image data set based at least on a second image data set corresponding to second region among the raw image data obtained through the image sensor, according to the illuminance corresponding to the raw image data falling within a second range including a range which is higher than the first range, the processor being configured to generate the RGB image based on the request being set to be performed using a first function of the image sensor, wherein the RGB image generated according to the illuminance corresponding to the raw image data falling within the first range includes an infrared component, and the RGB image generated according to the illuminance corresponding to the raw image data falling within the second range does not include the infrared component, and
perform biometric authentication associated with the external object using the second raw image data corresponding to the light in the infrared band obtained through the image sensor, based on the request being set to be performed using a second function of the image sensor.

2. The electronic device of claim 1,
wherein the image sensor includes a first sensor pixel set arranged to respond to light passing through a filter configured to transmit at least a part of the light in the infrared band and the visible band, and a second sensor pixel set arranged to respond to light passing through a filter configured to transmit at least a part of the light in the infrared band and block the light in the visible band, and
wherein the processor is further configured to:
obtain raw image data including a first image data set obtained through the first sensor pixel set and a second image data set obtained through the second sensor pixel set, using the image sensor, and
obtain the first raw image data or the second raw image data using at least a part of the raw image data.

3. The electronic device of claim 2, wherein the processor is further configured to:
as a part of an operation of generating the RGB image, correct at least a part of the second image data set using a first parameter based on a color temperature corresponding to the raw image data satisfying a specified first range, and correct at least a part of the second image data set using a second parameter based on the color temperature satisfying a specified second range, and
generate the RGB image in which a component corresponding to the infrared band is corrected in the first image data set, using at least a part of the corrected second image data set.

4. The electronic device of claim 3, wherein the processor is further configured to:
as a part of an operation of generating the RGB image, correct at least a part of the second image data set using the first parameter, using at least a part of the corrected second image data set according to a color temperature corresponding to the raw image data satisfying a color temperature range of fluorescent light, and generate the RGB image in which a component corresponding to the infrared band is corrected in the first image data set, using the at least a part of the second image data set which is corrected, and
correct at least a part of the first image data set and at least a part of the second image data set using the second parameter according to a color temperature corresponding to the raw image data satisfying a color temperature range of incandescent light, and generate the RGB image in which a component corresponding to the infrared band is corrected in the first image data set, using the at least a part of the first image data set and the at least a part of the second image data set which are corrected.

5. An electronic device comprising:
an image sensor including a color filter array, the color filter array including a first region transmitting visible light and infrared light and a second region transmitting infrared light;
a memory; and
a processor electrically connected to the image sensor and the memory,
wherein the processor is configured to:
execute an application,
obtain first raw image data using a first image data set corresponding to the first region among raw image data obtained through the image sensor in response to a request to obtain a red-green-blue (RGB) image from the application, and provide the RGB image generated based at least on the obtained first raw image data to the application, and
obtain second raw image data using a second image data set corresponding to the second region among raw image data obtained through the image sensor in response to a request to obtain an infrared (IR) image from the application, and provide the IR image generated based at least on the obtained second raw image data to the application,
wherein the processor is further configured to
obtain the first raw image data using the first image data set according to an illuminance corresponding to the raw image data falling within a first range, and
obtain the first raw image data using at least a part of the raw image data in which a component corresponding to infrared light included in the raw image data is corrected in the first image data set based at least on the second image data set, according to the illuminance corresponding to the raw image data falling within a second range including a range which is higher than the first range, and
wherein the RGB image obtained according to the illuminance corresponding to the raw image data falling within the first range includes an infrared component, and the RGB image obtained according to the illuminance corresponding to the raw image data falling within the second range does not include the infrared component.

6. The electronic device of claim 5, wherein the first region includes a region transmitting red light and infrared light, a region transmitting green light and infrared light, and a region transmitting blue light and infrared light.

7. The electronic device of claim 5, wherein the first range is defined as being lower than a predetermined illuminance, and the second range is defined as being higher than or equal to the predetermined illuminance.

8. The electronic device of claim 5, wherein the processor is further configured to:
correct a component of the raw image data corresponding to the infrared light based at least on the second image data set using a first method according to a color temperature corresponding to the raw image data falling within a first range,
correct a component of the raw image data corresponding to the infrared light based at least on the second image data set using a second method different from the first method according to a color temperature corresponding to the raw image data falling within a second range, and
obtain the first raw image data using at least a part of the corrected raw image data.

9. The electronic device of claim 8, wherein the processor is further configured to correct a component of the raw image data corresponding to the infrared light further based on at least a part of the first image data set.

10. The electronic device of claim 8, wherein the first range is defined as being lower than a predetermined color temperature, and the second range is defined as being higher than or equal to the predetermined color temperature.

11. The electronic device of claim 5, wherein the processor is further configured to:
further obtain third raw image data corresponding to the second region and including a visible light component and an infrared component based on the first raw image data in response to the request to obtain the RGB image, and remove an infrared component included in the first raw image data and the third raw image data based on the second raw image data, and wherein the RGB image is generated based on the first raw image data and the third raw image data.

12. The electronic device of claim 5, wherein the processor is further configured to further obtain fourth raw image data corresponding to the first region and including an infrared component based on the second raw image data in response to the request to obtain the IR image, and wherein the IR image is generated based on the second raw image data and the fourth raw image data.

13. The electronic device of claim 5, further comprising:

a display, wherein the processor is further configured to:

obtain the first raw image data using the first image data set corresponding to the first region among the raw image data obtained through the image sensor in response to the request to obtain the IR image, and display the RGB image generated based at least on the obtained first raw image data on the display, and provide the IR image to the application while the RGB image is displayed on the display.

* * * * *